US00H002184H

(19) United States

(12) Statutory Invention Registration

Rockwell

(10) Reg. No.: US H2184 H

(43) Published: Mar. 6, 2007

(54) WIDE DYNAMIC RANGE VECTOR DATA RASTER DISPLAY

(75) Inventor: Kenneth R. Rockwell, Carlsbad, CA (US)

(73) Assignee: Tektronix, Inc., Beaverton, OR (US)

(21) Appl. No.: 10/917,908

(22) Filed: May 7, 2004

(51) Int. Cl.
*G06T 11/20* (2006.01)

(52) U.S. Cl. ..... 345/440.1

(58) Field of Classification Search ..... None
See application file for complete search history.

(56) References Cited

U.S. PATENT DOCUMENTS

2004/0227773 A1 * 11/2004 Hier et al. ..... 345/690

OTHER PUBLICATIONS

"Gradient Domain High Dynamic Range Compression" by Raanan Rattal, et al., http://www.cs.hji.ac.il/%7Ewerman/Papers/hdrc.pdf.

"Image Enhancement via HDR Compression" http://www.cs.huji.ac.il/~danix/hdr/enhancement.html.

"High Dynamic Range Compression Results" http://www.cs.huji.ac.il/~danix/hdr/results.html.

* cited by examiner

*Primary Examiner*—Dan Pihulic

(74) *Attorney, Agent, or Firm*—Francis I. Gray

(57) ABSTRACT

A wide dynamic range vector data raster display of a waveform image is obtained by using a small matrix of pixels from a source frame buffer containing waveform image data to calculate a value for each pixel on a target display. Any of several algorithms may be used for this transform function, such as the unsharp masking (USM) algorithm used in digital photography. This results in increasing the dynamic range of the displayed waveform image over simple pixel-by-pixel intensity mapping.

1 Claim, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PLAIN.GIF

PLAIN.GIF

CLIPPED.GIF

GAMMA.GIF

USM.GIF

WIDE DYNAMIC RANGE VECTOR DATA RASTER DISPLAY

BACKGROUND OF THE INVENTION

The present invention relates to data display, and more particularly to a wide dynamic range vector data raster display.

Raster scanned displays, such as CRTs and LCDs, have lower peak brightness than vector scanned CRTs since they have no ability to stop the electron beam at one point. Attempting to display a representation of a complex vector-drawn CRT waveform, typical for live video, on a rasterized display results in losing detail in some parts of the image, usually by clipping the brightest parts. FIG. 1 shows a waveform image on a display without any processing—direct one-to-one mapping from a source to a display. When vector scanned and raster scanned waveform monitors are compared side-by-side, it is obvious that the brightest areas of the waveform lack detail, i.e., "clip", on the raster displays. Adjusting the display brightness control to correct this makes the other areas of the waveform too dark. As shown in FIG. 2 the waveform image is clipped by increasing brightness of the display, resulting in more detail in dark areas while eliminating detail in light areas. Another transform function that is used is a gamma transform function, as shown in FIG. 3, that lightens the dark and medium areas, but does not clip the highlights. Unfortunately contrast is lost in the light areas of the waveform image. The transform functions for FIGS. 1, 2 and 3 are shown in FIG. 4. Some applications, especially video waveforms, require detail in all parts of the waveform at all levels of Z-axis brightness.

Currently the display is captured with a source frame buffer where the value of each pixel (address) in the source frame buffer increments every time it is calculated that a hypothetical electron beam representing the waveform would be striking that location. The desired brightness of each displayed target pixel is represented by the value of each address in the source frame buffer. These values may also be decremented with time to represent decay of a CRT. There are two problems: not enough bit depth in each accumulator to capture the full dynamic range for display; and no readily available algorithm for lowering the overall contrast of the display without also lowering the detail and perceived sharpness and clarity of the gray areas of complex waveforms. Only one-dimensional calculations, as shown in FIG. 5, are used to translate from source frame buffer pixel values to target display pixel values.

What is desired is the ability to provide a wide dynamic range vector data raster display so a viewer may see subtle detail within all the darkest and lightest parts of an image.

BRIEF SUMMARY OF THE INVENTION

Accordingly the present invention provides a wide dynamic range vector data raster display by using a small matrix of pixels from a source frame buffer containing waveform image data to calculate a value for each pixel on a target display. Any of several algorithms may be used for this transform function, such as the unsharp masking (USM) algorithm used in digital photography. This results in increasing the dynamic range of the displayed waveform image over simple pixel-by-pixel intensity mapping.

The objects, advantages and other novel features of the present invention are apparent from the following detailed description when read in conjunction with the appended claims and attached drawing.

DETAILED DESCRIPTION OF THE INVENTION

Figure 1:
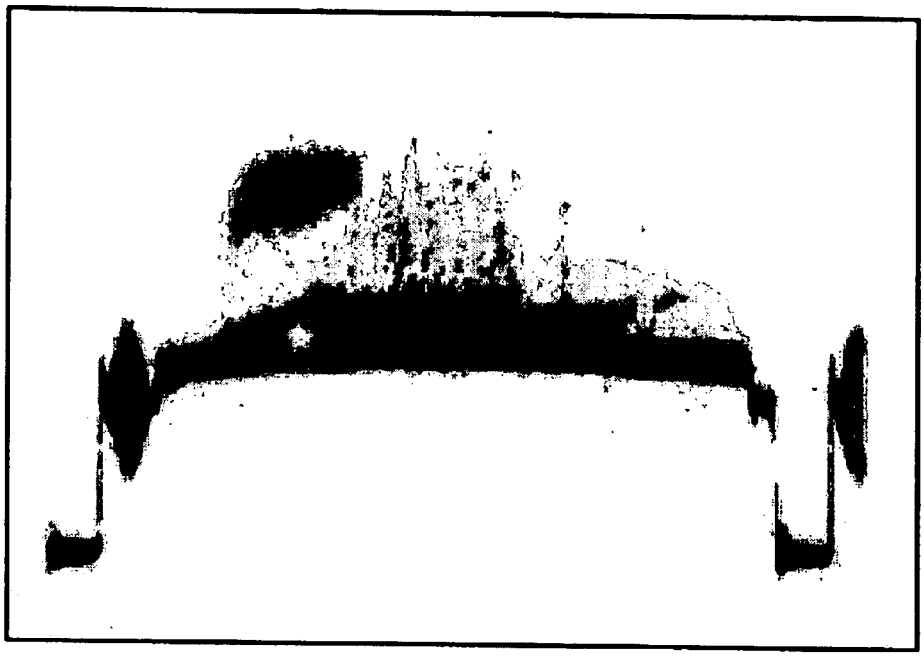
FIG. 1 is a graphic view of a waveform display without processing.
Figure 2:
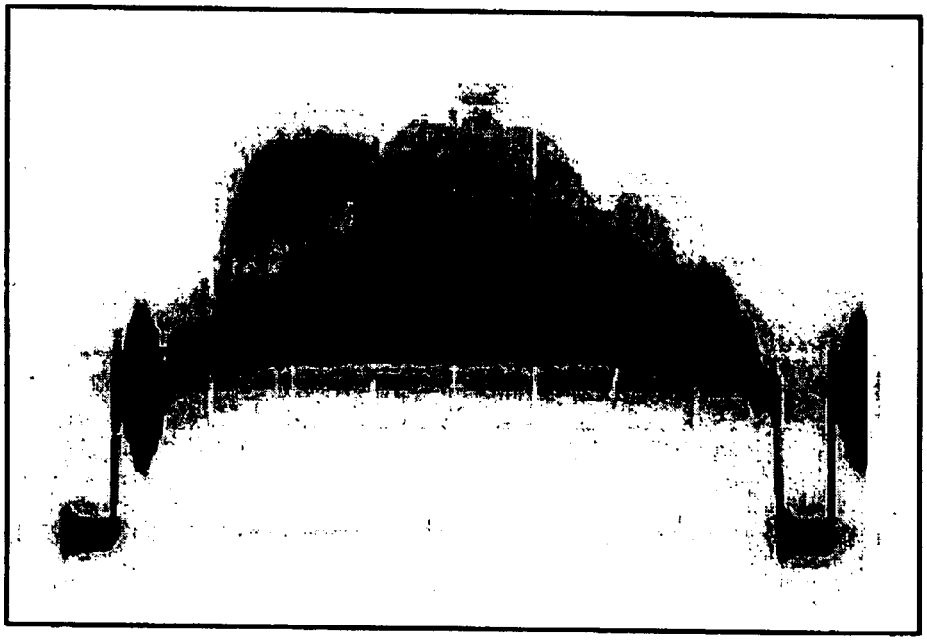
FIG. 2 is a graphic view of a waveform display with clipping.
Figure 3:
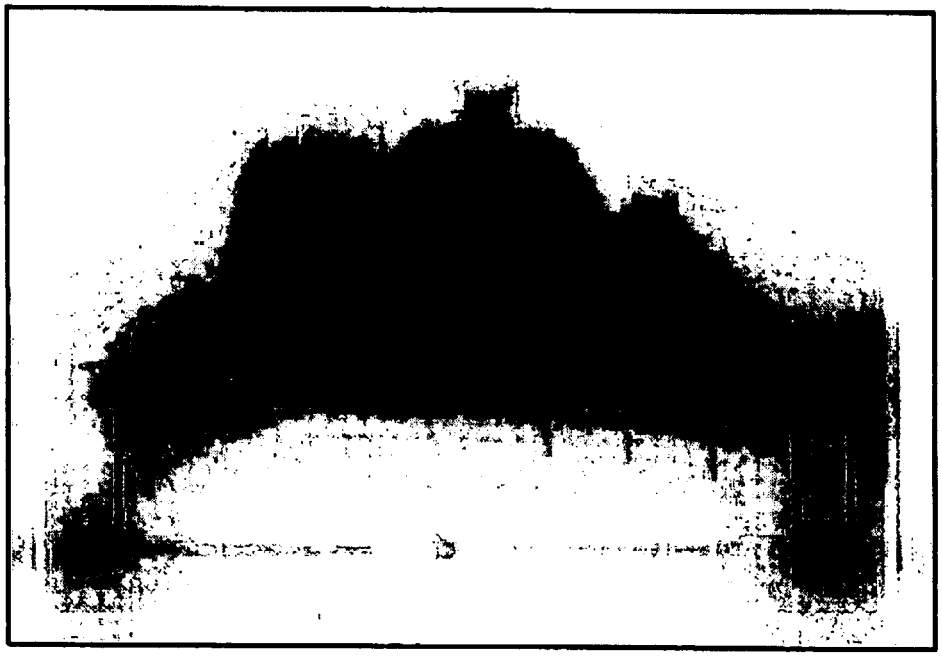
FIG. 3 is a graphic view of a waveform display with gamma transformation.
Figure 7:
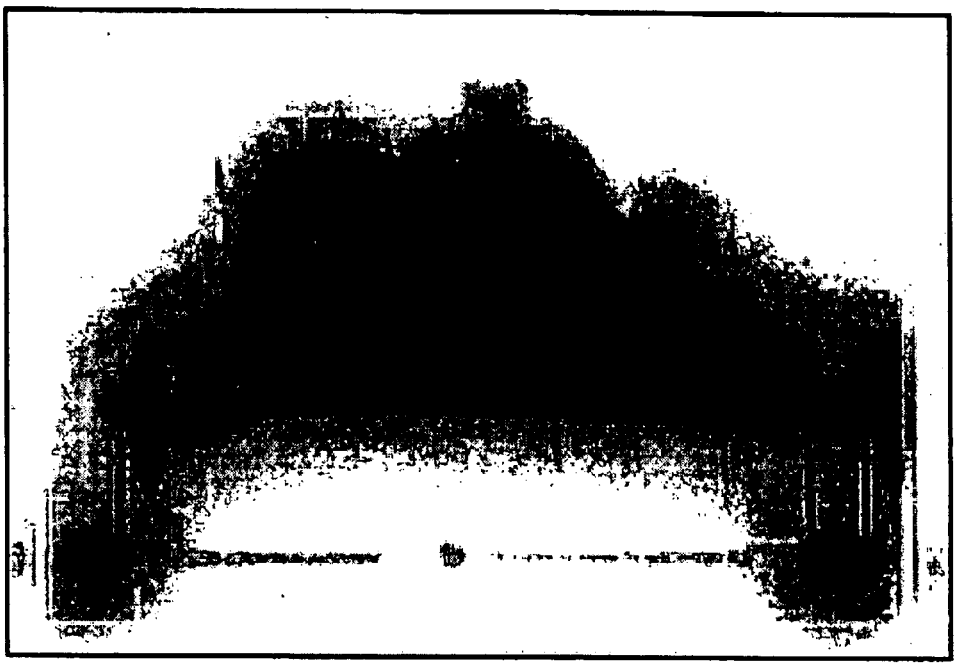
FIG. 7 is a graphic view of a waveform display processed according to the present invention.
Figure 4:
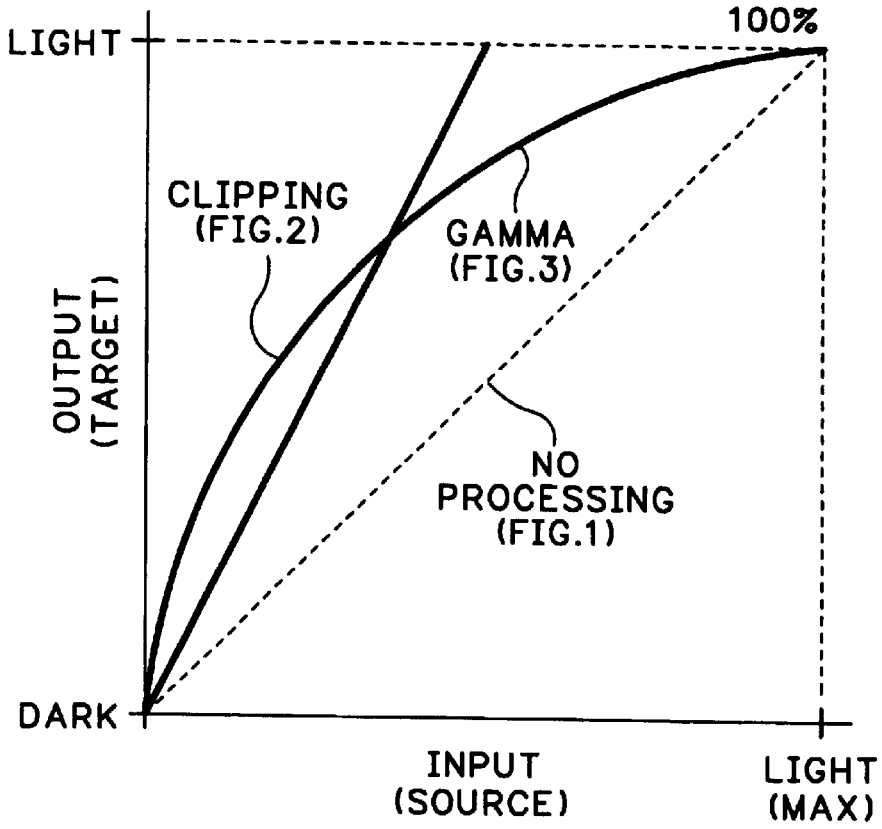
FIG. 4 is a graphic view of the various transform functions corresponding to the waveform displays of FIGS. 1–3.
Figure 5:
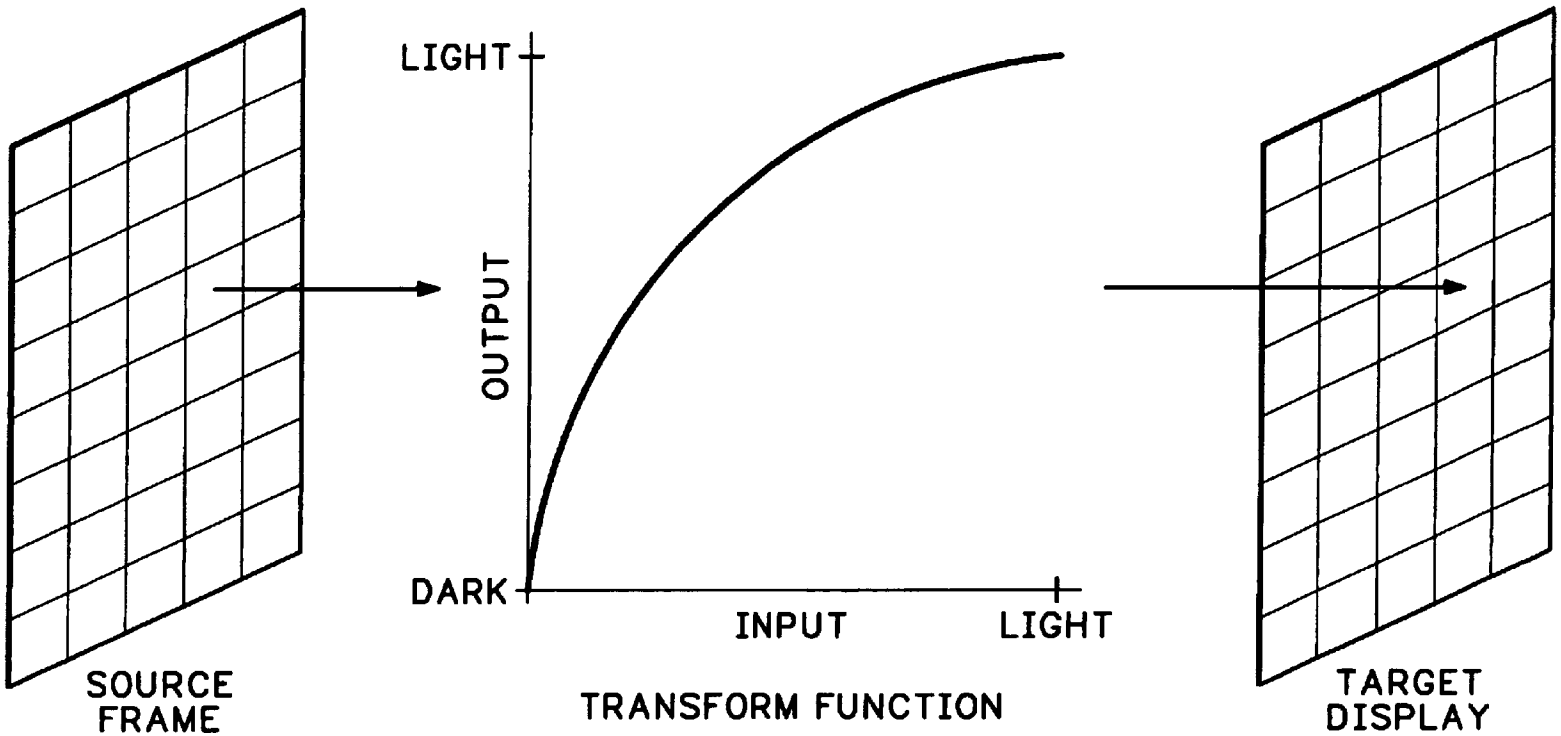
FIG. 5 is a block diagram view of prior art processing of waveform image data for display.
Figure 6:
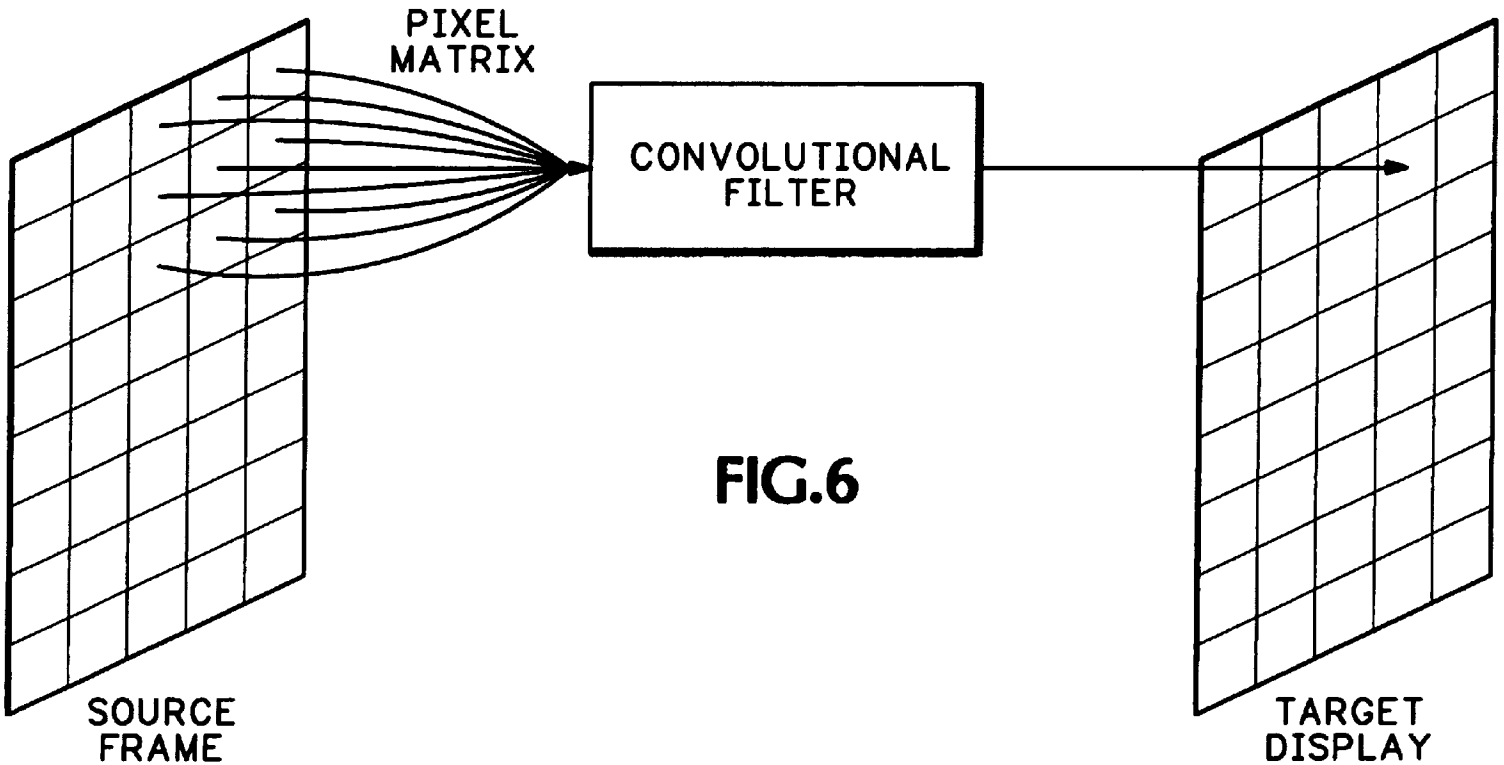
FIG. 6 is a block diagram view of processing of waveform image data for display according to the present invention.

To resolve the problems referenced above, the value for each display target pixel is calculated by an algorithm that uses a matrix of several pixels over a two-dimensional area of a source frame buffer which contains acquired waveform data, as shown in FIG. 6, instead of just using a simple one-to-one look-up table or other simple transform function. Such algorithms are commonly used in digital photography that attempt to mimic the action of the human eye to reduce overall contrast of a scene—reducing gain at low spatial frequencies, while not reducing the sense of local contrast or detail, and retaining or even increasing gain at high spatial frequencies. Therefore a two-dimensional convolutional filter is used to increase the local contrast from pixel-to-pixel while reducing the overall contrast between large regions with a gamma curve. This allows retention of detail in all areas of the waveform, as shown in FIG. 7, while allowing display of the complete dynamic range on a limited dynamic range device, such as an LCD. FIG. 7 shows the same waveform image as in FIGS. 1–3 that is processed by a gamma transformation function and convolutional filtered using a USM filter algorithm, as described below. The contrast and detail previously invisible by the prior methods discussed above are restored. The detail and brightness in the dark areas is similar to the "clipped" image of FIG. 2, but the detail is far better in the light areas of the waveform image. The additional filtering may be implemented in either hardware, software or both.

In photography a 3×3 or 5×5 matrix multiply is typically used to apply a convolutional filter called an "Unsharp Mask" (USM). The counterintuitive phrase "unsharp mask" refers to a traditional photographic process employed to print high dynamic range positive images on paper with limited brightness range. Here a low-contrast, slightly out-of-focus ("unsharp") negative is made directly from contact printing from the positive film with a sheet of diffusion material between the two and then this low-contrast negative (the "mask") after development is laid over the positive image. Since the mask is unsharp, it does not reduce the small details but, since it is a negative, it does lower the brightness of the brightest parts while leaving the dark areas unchanged.

An even better and smarter filter algorithm over the simple USM algorithm is described in a SIGGRAPH paper entitled "Gradient Domain High Dynamic Range Compression" by Raanan Fattal et al. Another very effective filter algorithm attempting the same thing is sold commercially for use in Adobe Photoshop software by Applied Science Fiction and called "SHO".

Thus by using a small matrix of pixel values from the frame buffer to calculate the value for each display target pixel, the dynamic range of the waveform image is increased over simple pixel-by-pixel intensity mapping.

What is claimed is:

1. A method of displaying a waveform image with wide dynamic range comprising the steps of:

acquiring waveform image data in a source frame buffer; and convolutional filtering a small matrix of pixels from the source frame buffer to obtain a value for each pixel on a target display.

* * * * *